United States Patent [19]

Nowack et al.

[11] 3,912,787

[45] Oct. 14, 1975

[54] SELECTIVE PARTIAL HYDROGENATION OF AROMATICS

[75] Inventors: Gerhard P. Nowack; Marvin M. Johnson, both of Bartlesville, Okla.

[73] Assignee: Phillips Petroleum Company, Bartlesville, Okla.

[22] Filed: June 21, 1974

[21] Appl. No.: 481,774

Related U.S. Application Data

[63] Continuation-in-part of Ser. No. 275,348, July 26, 1972, abandoned.

[52] U.S. Cl.................................. 260/667; 260/666
[51] Int. Cl.²........................................... C07C 5/10
[58] Field of Search ........ 260/667, 666 A; 208/143, 208/144

[56] References Cited
UNITED STATES PATENTS

| | | | |
|---|---|---|---|
| 3,183,278 | 5/1965 | Koch, Jr. ............................ | 260/667 |
| 3,227,768 | 6/1966 | Cole et al. ........................... | 260/667 |
| 3,391,206 | 7/1968 | Hartog ............................. | 260/666 R |
| 3,617,511 | 11/1971 | Jenkins .............................. | 208/112 |
| 3,760,018 | 9/1973 | Suggitt et al. ....................... | 260/668 |
| 3,829,515 | 8/1974 | Zuech et al. ........................ | 260/667 |

*Primary Examiner*—Delbert E. Gantz
*Assistant Examiner*—Juanita M. Nelson

[57] ABSTRACT

Aromatics are selectively partially hydrogenated to substantial amounts of cyclic olefins by contacting the aromatics under hydrogenation conditions with hydrogen and with an aqueous dispersion of a solid ruthenium-containing catalyst promoted with a modifying amount of a transition metal and wherein the aqueous dispersion is maintained at essentially neutral or acid pH conditions.

18 Claims, No Drawings

SELECTIVE PARTIAL HYDROGENATION OF AROMATICS

This application is a continuation-in-part application of our copending application having Ser. No. 275,348, filed July 26, 1972, now abandoned.

This invention relates to the hydrogenation of aromatics. In accordance with one aspect, this invention relates to selective partial hydrogenation of aromatics with modified or promoted ruthenium-containing catalysts. In accordance with a further aspect, this invention relates to the selective partial hydrogenation of aromatics with a ruthenium-containing catalyst promoted with transition metals. In accordance with a further aspect, this invention relates to the selective partial hydrogenation of aromatics using solid ruthenium-containing catalysts dispersed in an aqueous phase within the reaction zone wherein the aqueous phase is maintained at an essentially neutral or acid pH condition. In accordance with a further aspect, aromatics such as benzene are selectively partially hydrogenated to substantial amounts of cyclohexene by contacting same with a promoted ruthenium-containing catalyst.

In the catalytic hydrogenation of organic compounds containing two or more reducible groups, it is frequently desired to hydrogenate one or more of these groups while leaving one or more of the remaining reducible groups hydrogenated. It is possible to achieve this end by the selection of a suitable catalyst and operating conditions, but selectivity to a desired cyclic olefin is low and continued research efforts attempt to improve the selectivity of various catalysts to produce desired products.

Unsaturated cyclic hydrocarbons, such as cyclohexene, are in substantial demand, particularly in the polymerization field. The problem is the relatively high cost and the relative difficulty with which such compounds are manufactured. The present invention contributes to the solution of the problem by providing an alternative route to the production of such mono-unsaturated cyclic compounds.

Aromatics such as benzene can be hydrogenated by a number of prior art catalytic processes. In some noble metal catalyzed processes, minor amounts of cyclohexene can be obtained from benzene, but only if the total benzene conversion is kept very low, say, at one percent. Attempts to increase conversion to a more practical level generally result in producing the completely hydrogenated cyclohexane to the virtual exclusion of any appreciable amounts of cyclohexene. An objective, thus, is to convert benzene to cyclohexene with both a substantial conversion level and a substantial selectivity level.

The presence of an alkaline aqueous phase in such a noble metal-catalyzed hydrogenation has been found to be helpful in maintaining a significant selectivity to partially hydrogenated products while allowing the reaction to go to a reasonable level of aromatic conversion. However, the alkaline aqueous phase, under the typical reaction conditions, is corrosive and is severely limiting with regard to materials of construction for the apparatus used in the process. Even more complicating is the problem of catalyst system contamination. The alkaline aqueous phase can not only corrode many solid materials in contact with it, but it can leach out at least trace amounts of metals which can be poisons to the noble metal-containing catalyst systems. Indeed, it has been found that contact of such alkaline aqueous phases with the walls of some stainless steel reactors leach out trace amounts of metals some of which inhibit the reaction while others of which are capable of promoting the reaction. Frequently, there the net result is erratic and/or poor performance.

Still another disadvantage of the highly alkaline systems is that they tend to chemically attack solid catalyst support materials and thus tend to preclude their use. Supported catalysts are desirable because they contribute to selectivity and facilitate continuous flow type operations. Thus, the alkaline aqueous systems are not considered to be economically feasible.

It has now been found that with a suitable combination of noble metal, transition metal promoter(s), and solid catalyst support material, aromatics can be selectively hydrogenated with relatively high selectivity, at relatively high levels of conversion, and with relatively short reaction times in the presence of an aqueous phase which is maintained at essentially neutral or acid pH conditions. Thus, the reaction can be carried out under conditions which are essentially neutral, slightly acidic, or moderately acidic, as desired, thereby avoiding the corrosivity and other resulting complications of the high pH aqueous phase-containing systems.

In accordance with the invention, it has been found that substantial amounts of cyclic olefins such as cyclohexene can be produced by the selective partial hydrogenation of aromatics such as benzene by carrying out the hydrogenation in the presence of an aqueous dispersion of a ruthenium-containing catalyst modified by the presence of a promoting amount of transition metal ions, and wherein the pH of the aqueous dispersion is less than about 7.5. It has been found that cations of selected transition metals that contain an unfilled d orbital shell interact with ruthenium and promote the hydrogenation of aromatics to cyclic olefins.

Accordingly, an object of this invention is to provide an improved process for the selective partial hydrogenation of aromatics.

A further object of this invention is to provide an improved process for the production of cyclic olefins from aromatics.

A further object of the invention is to provide an improved catalyst which is selective for the partial hydrogenation of aromatics.

Another object of this invention is to provide a transition metal promoted catalyst effective for the partial hydrogenation of aromatics.

Still another object of the invention is to provide an aqueous dispersion as the reaction medium for the partial hydrogenation of aromatics which results in improving the selectivity and conversion of the reactants to the desired products.

A still further object of this invention is to provide a commercially feasible process for the production of cyclic olefins from aromatics.

Other objects and aspects, as well as the several advantages of the invention, will be apparent to one skilled in the art upon reading the specification and the appended claims.

In accordance with the invention, aromatics are selectively partially hydrogenated to cyclic olefins by contacting same under hydrogenation conditions in the presence of a ruthenium-containing catalyst promoted with a modifying amount of a promoting transition metal and an aqueous dispersion having a pH less than about 7.5.

More specifically according to the invention, it has been found that cyclic olefins such as cyclohexene can be produced from aromatics such as benzene by selective partial hydrogenation by contacting the aromatics with a solid supported ruthenium-containing catalyst modified by the presence of promoting transition metal ions in an aqueous phase dispersion wherein the pH of the dispersion is less than about 7.5 when measured at 25°C.

In one embodiment, a high yield of cyclohexene is obtained by the partial hydrogenation of benzene in contact with water containing a dispersion of a catalyst comprising a suitable solid catalyst support material which is associated with a ruthenium component and at least one promoting component selected from metals of Groups VIB, VIIB, and the iron subgroups of Group VIII.

In accordance with another embodiment, methyl cyclohexenes are produced in good yield by the partial hydrogenation of toluene in water in the presence of a ruthenium catalyst promoted with nickel and manganese.

In accordance with a further embodiment, a high yield of tetrahydronaphthalenes is obtained by the partial hydrogenation of naphthalene over a ruthenium catalyst promoted with cobalt in an aqueous phase.

In accordance with still another embodiment, tetrahydronaphthalenes are converted to octahydronaphthalenes by partial hydrogenation over a ruthenium catalyst promoted with cobalt in an aqueous phase.

The feedstocks which are suitable for use in the present process are aromatic compounds selected from (a) mononuclear aromatic compounds and alkyl derivatives thereof, (b) condensed polyaromatic compounds and alkyl derivatives thereof, and (c) noncondensed polyaromatic compounds and alkyl derivatives thereof.

Some preferred compounds (a) are represented by the formula

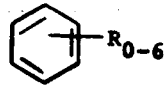

wherein R is a saturated aliphatic hydrocarbon radical having 1–14 carbon atoms, wherein two R groups can be joined to form a ring, and wherein the total number of carbon atoms in the molecule does not exceed about 20. Some examples of these are benzene, toluene, the xylenes, 1,4-diheptylbenzene, tetrahydronaphthalene, and the like, and mixtures thereof.

Some preferred compounds of (b) are represented by the formula

wherein R is as defined above, wherein two R groups can be joined to form a ring, and wherein the total number of carbon atoms in the molecule does not exceed about 20. Some examples are naphthalene, 1,2-dimethyl naphthalene, 1-decylnaphthalene, and the like, and mixtures thereof.

Some preferred compounds (c) are represented by the formula

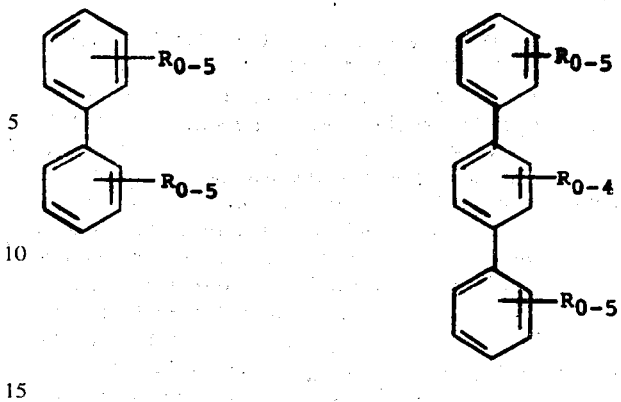

wherein R is as defined above, wherein two R groups can be joined to form a ring, and wherein the total number of carbon atoms in the molecule does not exceed about 50. Some examples are biphenyl, terphenyl, 2-ethylbiphenyl, 4,4'-dimethylbiphenyl, 3-octylbiphenyl, 1-ethylterphenyl, and the like, and mixtures thereof.

The selective hydrogenation reaction is catalyzed by ruthenium modified with a reaction-promoting transition metal. The ruthenium can be in the elemental state such as in the form of a powder, colloidal dispersion, or distributed on the surface of a high surface catalytic support. Such ruthenium catalysts are known in the art, and their preparation is not necessarily part of this invention. A finely divided dispersion of ruthenium can be prepared by reacting a ruthenium compound with aluminum metal.

The ruthenium containing catalyst is promoted with a modifying amount of a transition metal capable of promoting the hydrogenation reaction. The transition metals which have been suitable as effective modifiers are metals found in Groups IIIB, IVB, VB, VIB, VIIB, and in the iron subgroups of Group VIII. The presently preferred transition metals found as effective modifiers for the selective ruthenium-containing catalyst are metals of Groups VIB, VIIB, and the iron subgroups of Group VIII, namely, chromium, molybdenum, tungsten, manganese, iron, cobalt, and nickel. The proportion of promoting transition metal to the ruthenium metal in the catalyst will vary according to the transition metal, but will generally be in the range of from about 0.01 to about 2, preferably about 0.1 to about 1, moles promoting metal to each mole of ruthenium.

The ruthenium catalyst is preferably associated with a solid support material. The catalyst supports which can be used in the catalyst of the invention are, for example, silica, alumina, titania, charcoal, and the like, and mixtures thereof, as well as other suitable difficultly reducible refractory materials. Other examples include chromia, silicaalumina, clay, zirconia, titania, and zinc aluminate. Zinc aluminate is a particularly effective support material because of its contribution to catalyst performance and because of its stability in water. When such supported catalysts are used, the catalysts will contain generally from about 0.001 weight percent to about 25 weight percent ruthenium, preferably 0.01 to 2 weight percent ruthenium, based on the weight of the support.

The ruthenium and the transition metal promoter can be associated with the solid catalyst support using any suitable catalyst preparation technique such as impregnation, wet mixing, coprecipitation, and the like. The compounds of these materials which can be used for catalyst preparation include the metal oxides, metal compounds convertible to the metal oxide on calcination, or the metals themselves. When using the impregnation method, the support material is contacted with an aqueous solution of water-soluble compounds of ruthenium and one or more promoter metals. The water-soluble halides of these metals are particularly suitable for this procedure.

After suitable compounds of ruthenium and promoter metals have been associated with the support material, the composites can be introduced directly into the reaction zone. Alternatively, the composites can be treated with a reducing agent such as hydrogen at 400°–1000°F for 0.1–10 hours before being introduced into the reaction zone. If desired, the composite can be calcined in air for 0.1–10 hours at 500°–1000°F prior to the treatment with hydrogen. Depending on the desired mode of reaction, the solid supported catalyst can be in the form of relatively large shapes such as pellets, extrudates, etc., or relatively fine particles such as small agglomerates, powders, and the like.

Although it is presently preferred to utilize a preformed catalyst in which both the ruthenium and the promoter metal have become associated with the support material, a supported ruthenium composite and a suitable compound of a promoter metal can be separately introduced into the reaction zone, if desired.

Although ruthenium and the promoting transition metal elements are spoken of as metals and although a hydrogen treatment of the catalyst composite is presently preferred, these materials do not necessarily present in the totally metallic state within the reaction zone nor is the metallic state of these materials necessarily believed to be the specific catalyzing species. The mechanism of the improved reaction is not completely understood, but it is presently believed that very small amounts of the transition metal cations are capable of significantly influencing the selectivity of the reaction. The cations of suitable transition metals can be present initially or can be generated in situ under the conditions of the reaction.

As indicated above, the selective hydrogenation is carried out in the presence of an aqueous dispersion of the catalyst wherein the pH of the aqueous dispersion is maintained at less than about 7.5. The pH of the aqueous dispersions of many combinations of catalyst components can fall into this range without further action. However, common agents, such as HCl or NaOH, can be used to adjust the pH to this range or to another level within this range.

The reaction temperatures for the catalytic hydrogenation of the present invention are in the range of from about 100°F to about 400°F. However, reaction temperatures can also range up to about 500°F, although preferred reaction temperatures are 300°–400°F. The reaction pressure will be sufficient to maintain liquid phase conditions at the above temperatures and will generally be in the range of 100–2000 psig hydrogen pressure.

The weight of catalyst used for the partial hydrogenation is selected to obtain a reasonable conversion in a reasonable length of time. Generally, the ratio of catalyst to the compound to be hydrogenated can vary from about one part by weight catalyst to 5 to 200 parts by weight compound. The length of time required for the reaction can vary from about 10 minutes to about 24 hours with about 45 minutes to 4 hours more preferred.

Four phases are present during the hydrogenation process comprising an aqueous phase, a hydrocarbon phase, a solid catalyst phase, and a gaseous molecular hydrogen phase. Parts of the water can be replaced with another solvent such as dioxane, alcohol, glycerol, and the like during some reactions. In some instances, however, selectivity to the desired hydrogenated product may be adversely affected by such substitution.

The best results are obtained when the catalyst phase remains in the aqueous phase during the reaction. Thus, if a catalyst support is used which is hydrophobic in nature, it is desirable to treat such support with a wetting agent, for example, to impart hydrophilic properties to the support.

In carrying out the hydrogenation, the hydrogen-containing gas, for instance, $H_2$ per se, is passed into the liquid mass of aromatic hydrocarbons which is in contact with an aqueous dispersion containing the supported or unsupported catalyst particles therein in a suitable reactor until sufficient hydrogen is absorbed or reacted to at least partially saturate the aromatic hydrocarbons to form the cyclic olefin product. The process can be carried out either batchwise or continuously. If desired, the aromatic feed can be diluted with a suitable diluent such as a saturated hydrocarbon.

The amount of water present in the reaction zone should be sufficient to provide a distinct aqueous phase under the conditions of the reaction. Generally speaking, 0.1–10 parts of water will be present for each part of aromatic feed in the reaction zone, by weight.

The reaction can be carried out in any apparatus which is suitable for hydrogenation under the reaction conditions of temperature and pressure. Vigorous agitation means to provide vigorous and intimate contact of the two liquid phases with the hydrogen is presently preferred. The materials of construction of the apparatus at or near the reaction zone are chosen from those which are essentially inert to the materials within the reaction zone. Thus, stainless steel, glass-coated steel, Teflon-coated steel, and the like can be suitable depending upon the specific conditions and catalyst materials used.

After leaving the reaction zone, the desired product olefin can be separated from the reaction mixture by any convenient means such as by fractional distillation, extraction, and the like. Unconverted aromatic can be recycled to the reaction zone. The aqueous catalyst-containing phase can also be recycled to the reaction zone being fortified with additional catalyst or catalyst components as required.

EXAMPLE I

Benzene was converted to cyclohexene over a ruthenium catalyst promoted with nickel in an aqueous phase. The catalyst had been prepared by impregnating alumina powder with an aqueous solution containing appropriate quantities of $RuCl_3 \cdot 1-3H_2O$ and $NiCl_2 \cdot 6H_2O$ followed by evaporation, drying, crushing to a powder, and treatment with hydrogen at 400°F for 2 hours.

A reactor was charged with 2 grams of granular alumina catalyst containing 0.5 weight percent ruthenium and 0.05 weight percent nickel. Introduced into the autoclave reactor was a mixture of 280 grams of benzene and 100 grams of water. Hydrogen was charged to the reactor in an amount sufficient to provide a pressure of 1,000 psig, and the contents of the reactor were stirred for one hour at about 378°F.

The results showed a total conversion of 65.1 percent of the benzene to hydrogenated products with a selectivity to cyclohexene of 30.9 percent. Cyclohexene was obtained in 20.2 percent yield. After the run the pH of the aqueous phase was found to be 4.2.

EXAMPLE II

Toluene was converted to methylcyclohexenes over a ruthenium catalyst promoted with nickel and manganese in an aqueous phase. This catalyst had been prepared by impregnating powdered alumina with an aqueous solution containing appropriate quantities of the halides of ruthenium, nickel, and manganese. The slurry was dried, the solids crushed to a fine powder, then treated in hydrogen at 400°F for 1 hour, followed by an additional three hours at 800°F in hydrogen.

A reactor was charged with 2 grams of a granular alumina catalyst containing 0.5 weight percent ruthenium, 0.06 weight percent manganese, and 0.05 weight percent nickel. Introduced into the autoclave reactor was a mixture of 255 grams of toluene and 100 grams of water. Hydrogen was charged to the reactor in an amount sufficient to provide a pressure of 1,000 psig, and the contents of the reactor were stirred for one hour at about 382°F.

The results showed a total conversion of 72 percent of the toluene to hydrogenated products with a selectivity to the methylcyclohexenes of 25.6 percent. Methylcyclohexenes were obtained in 18.6 percent yield and consisted of about 65 percent of 1-methylcyclohexene, with the remainder consisting of a mixture of 3-methylcyclohexene and 4-methylcyclohexene.

EXAMPLE III

Naphthalene was converted to tetrahydronaphthalene over a ruthenium catalyst promoted with cobalt in an aqueous phase. The catalysts had been prepared by impregnating zinc aluminate powder with an aqueous solution containing appropriate amounts of the halides of ruthenium and cobalt. The resulting slurry was dried, then treated in hydrogen at 800°F for 1 hour.

A reactor was charged with 4 grams of a granular zinc aluminate catalyst containing 0.5 weight percent ruthenium and 0.13 weight percent cobalt. Introduced into the autoclave reactor was a mixture of 30 grams of naphthalene contained in 270 grams of cyclohexane and 90 grams of water. Hydrogen was charged to the reactor in an amount sufficient to provide a pressure of 1,000 psig, and the contents of the reactor were stirred for 1 hour at about 350°F.

The results showed a total conversion of 99 percent of the naphthalene to hydrogenated products with a selectivity to tetrahydronaphthalene of 95 percent. The yield of the tetrahydronaphthalene was 94 percent.

EXAMPLE IV

Tetrahydronaphthalenes were converted to octahydronaphthalenes over a ruthenium catalyst promoted with cobalt in an aqueous phase.

A reactor was charged with 4 grams of the granular zinc aluminate catalyst of Example III. Introduced into the autoclave reactor was a mixture of water and the hydrocarbons resulting from reaction of Example III. Hydrogen was charged to the reactor in an amount sufficient to provide a pressure of 1,000 psig, and the contents of the reactor were stirred for 1 hour at about 385°F.

The results showed a total conversion of 65 percent of the tetrahydronaphthalene to hydrogenated products with a selectivity to octahydronaphthalenes of 27 percent. The yield of octahydronaphthalenes was 17.6 percent and consisted of a mixture of $\Delta^9$ and $\Delta^1$ isomers in a ratio of 2 to 1. The pH of the aqueous phase utilized in this run was 5.7.

EXAMPLE V

A series of runs were carried out in which benzene was selectively hydrogenated to cyclohexene by the process of the present invention. The runs were carried out in a quartzlined 300 ml stirred autoclave. Unless otherwise noted, each run employed 1 g of catalyst, 40–45 g water, and 140–150 g benzene. The catalyst, water, and benzene were charged into the reactor. The reactor was flushed with hydrogen, then pressured to 500 psig with hydrogen, stirred for five minutes, and vented. The reactor was again pressured with hydrogen and heated such that the reaction period was carried out at 1000 psig while maintaining a temperature of 350°–400°F. The organic phase of the reaction mixture was periodically sampled and analyzed for cyclohexane and cyclohexene, and the conversion and selectivity were calculated at a time when the cyclohexene content of the reaction mixture began to level off.

The various catalysts were generally prepared by drying an aqueous slurry of the powdered support and appropriate amounts of the halide salts of the desired metals. The dried solids were crushed to a powder and treated with hydrogen at 400°F for 1–2 hours.

The results of these tests are shown in Table I below:

TABLE I

Converting Benzene to Cyclohexene

| Run | Catalyst Description | pH | Time, Min. | Conv. % | Sel. % |
|---|---|---|---|---|---|
| 1 | 1% Ru-0.01% Fe/Al$_2$O$_3$ | ND | 22 | 37.5 | 6.8 |
| 2 | Reused above + 0.06g CrCl$_3$.6H$_2$O | 4.5 | 16 hr. | 10.0 | 8.8 |
| 3 | 1% Ru-0.1% Fe/Alon C | ND | 30 | 70.4 | 10.0 |
| 4 | Reused above aqueous catalyst slurry | 4.5 | 58 | 20.3 | 29.7 |
| 5 | 1% Ru-0.1% Fe/Alon C | ND | 52 | 51.0 | 15.8 |
| 6 | Reused above aqueous catalyst slurry | ND | 85 | 51.1 | 24.9 |
| 7 | Reused same catalyst slurry | 5.0 | 45 | 24.3 | 32.6 |
| 8 | 0.5% Ru-0.05% Co/Alon C | ND | 50 | 68.6 | 20.0 |
| 9 | Reused above aq. catalyst slurry | 4.0 | 4.5 hr. | 34.7 | 23.4 |
| 10 | 0.5% Ru-0.05% Co/Alon C | ND[a] | 94 | 17.5 | 38.1 |
| 11 | Reused above aq. cat. slurry | 9.5[a] | 125 | 7.6 | 10.4 |
| 12[b] | 0.5% Ru-0.05% Ni/Alon C | ND | 62 | 60.6 | 34.0 |
| 13 | 0.5% Ru-0.06% Mn/Alon C | 4.4 | 48 | 78.5 | 24.2 |
| 14 | 0.5% Ru-0.05% Cr/Alon C | 3.9 | 60 | 77.2 | 22.1 |
| 15 | 0.5% Ru/Alon C | ND | 55 | 73.4 | 18.4 |

TABLE I-continued

Converting Benzene to Cyclohexene

| Run | Catalyst Description | pH | Time, Min. | Conv. % | Sel. % |
|---|---|---|---|---|---|
| 16 | Reused above aq.cat.slurry | 4.4 | 92 | 50.6 | 37.6 |
| 17[c] | 0.5% Ru-0.16% Ni/Alon C[a] | 4.4 | 90 | 4.6 | 24.6 |
| 18 | 0.5% Ru-0.16% Ni/Alon C[e] | 3.9 | 45 | 58.7 | 29.2 |
| 19 | 0.5% Ru-0.16% Ni/Alon C[f] | ND | 30 | 56.3 | 22.4 |
| 20 | Reused above aq. cat. slurry | 2.5 | 45 | 59.0 | 33.8 |
| 21 | 0.5% Ru-0.5% W/Alon C[g] | 4.1 | 30 | 45.9 | 19.8 |
| 22 | 0.5% Ru-0.1% Co-0.03%Mo/Alon C[h] | 3.9 | 70 | 17.2 | 17.7 |

[a]Aqueous catalyst slurry also included 0.1 g NH₄HCO₃ as alkaline agent.
[c]Carbon bearings on reactor replaced with Teflon bearings for this and all succeeding runs.
[d]Used Teflon coated reactor for this and all succeeding runs.
[e]Two grams catalyst used. Catalyst had been calcined in air at 1000°F for 30 minutes, then treated with hydrogen at 800°F for one hour.
[f]Two grams catalyst used. Catalyst had been treated with hydrogen at 800°F for three hours (no calcination was employed).
[g]Two grams catalyst used. After impregnation and drying, catalyst was charged directly to reactor without calcination or hydrogen treatment.
[g]Alon C is a commercial high purity form of synthetic alumina.
[h]Catalyst was treated with hydrogen at 800°F for 45 minutes-1 hour.

The invention runs of Table I show that benzene was converted to cyclohexene with relatively high conversion, at relatively high selectivities, and with relatively short reaction times. Comparison runs 10 and 11 which utilized the presence of an alkaline agent, namely, ammonium bicarbonate, show no advantage over the invention runs carried out under essentially neutral or slightly acidic conditions.

Comparison runs 15 and 16 which employ a non-promoted ruthenium catalyst similarly show no advantage over the promoted ruthenium catalyst runs of the present invention. Comparing invention runs 12, 13, and 14, to comparison run 15 shows that the invention runs exhibited a greater selectivity to cyclohexene.

The data in the table also show that the invention process is capable of recycle of the catalyst-containing aqueous phase to convert still another batch of benzene. Invention runs 17, 18, and 19 show that the process is operable with several different catalyst preparation procedures. Iron, chromium, cobalt, nickel, manganese, tungsten, and molybdenum are shown to be suitable promoters for the ruthenium catalyst.

EXAMPLE VI

Another series of runs was carried out in which benzene was selectively hydrogenated to cyclohexene. These were carried out in a manner similar to that of Example V except that the reactor was a 1-liter Teflon-lined autoclave. Unless otherwise noted, each run employed 260–280 g benzene and 90–100 g water.

The catalysts were prepared as described in Example V, except that the hydrogen treatment was carried out at 800°F for about 30 minutes to 1 hour. The results of these runs are shown in Table II below:

TABLE II

Conversion of Benzene to Cyclohexene

| Run | g | Catalyst Description | pH | Time, Min. | Conv. % | Sel. % |
|---|---|---|---|---|---|---|
| 1 | 2 | 0.5% Ru-0.06% Mn-0.05% Ni/Alon C | 3.7 | 40 | 53.7 | 25.8 |
| 2 | 2 | 0.5% Ru-0.05% Ni/Alon C | ND | 60 | 33.0 | 12.4 |
| 3 | | Reused above + 0.0067g NiCl₂.6H₂O | 5.1 | 75 | 12.4 | 12.1 |
| 4 | 2 | 0.5% Ru-0.29% Ni/Alon C | ND | 170 | 38.7 | 27.4 |
| 5 | 2 | 0.5% Ru-0.05% Ni/Cr₂O₃ | ND | 6 | 26.1 | 16.4 |
| 6 | | Reused above aqueous catalyst slurry | 7.0 | 10 | 40.5 | 14.9 |
| 7 | 2 | 0.5% Ru-0.29% Ni/Cr₂O₃ | ND | 43 | 40.3 | 26.0 |
| 8 | 1[a] | 0.5% Ru-0.05% Ni/Alon C (OgH₂O) | ND | 70 | 14.5 | 5.4 |
| 9 | —[a] | Reused above + 3 g H₂O | ND | 125 | 24.4 | 2.4 |
| 10 | —[a] | Reused above + 1g more + 7g H₂O | ND | 58 | 34.9 | 2.2 |
| 11 | —[a] | Reused above + 20 g H₂O | 3.8 | 45 | 75.6 | 16.5 |
| 12 | 2 | 0.5% Ru-0.1% Pd/Alon C | ND | 45 | 42.4 | 9.9 |
| 13 | 2 | 0.5% Ru-0.05% Ni/Filtrol 71[b] | 3.0 | 85 | 57.0 | 16.2 |
| 14 | 2 | 0.5% Ru-0.25% Ni/Filtrol 71 | 3.3 | 27 | 5.8 | 25.8 |
| 15 | —[c] | 0.031% g RuCl₃.3H₂O-0.0073 g NiCl₂.6H₂O | 3.0 | 135 | 30.4 | 1.6 |
| 16 | 2 | 0.5% Ru-0.05% Ni/SiO₂ | 6.0 | 40 | 37.4 | 15.5 |
| 17 | 2 | 6.0% Ni-19% W/SiO₂ | ND | 40 | 0.01 | t |
| 18[d] | 2 | 0.5 Ru-0.06% Co/Zr O₂-SiO₂ | 8.1 | 40 | 0.1 | t |
| 19 | 4 | 0.5% Ru/ZrO₂[c] | ND | 40 | 38.2 | 24.0 |
| 20 | — | Reused above + 0.06g CrCl₃.6H₂O | 6.5 | 75 | 51.3 | 22.1 |
| 21 | 4 | 0.5% Ru-0.025 Cr/ZrO₂ | 7.7 | 35 | 36.4 | 24.7 |
| 22 | 4 | 0.5% Ru-0.05% Cr/ZrO₂ | 7.3 | 50 | 34.3 | 26.9 |
| 23 | 5 | 0.5% Ru-0.25% Cr/ZrO₂ | 7.3 | 70[f] | 9.3 | 34.3 |
| 24 | 2 | 0.5% Ru-0.05% Ni/ZrO₂ | ND | 160 | 28.1 | 11.1 |
| 25 | 2 | 0.5% Ru-0.06% Co/ZrO₂ | 7.4 | 25 | 36.3 | 29.5 |
| 26 | 4 | 0.5% Ru-0.03% Fe/ZrO₂ | 7.8 | 70 | 54.4 | 24.4 |
| 27 | 5 | 0.5% Ru-0.03% Fe/ZrO₂ | ND | 53 | 47.6 | 27.7 |

TABLE II-continued

Conversion of Benzene to Cyclohexene

| Run | g | Catalyst Description | pH | Time, Min. | Conv. % | Sel. % |
|---|---|---|---|---|---|---|
| 28 | 4 | 0.5% Ru-0.06% Fe/ZrO$_2$ | 7.4 | 160 | 21.8 | 27.4 |
| 29 | 4 | 0.5% Ru-0.06% Mn/ZrO$_2$ | ND | 15 | 31.6 | 26.8 |
| 30 | 2 | 0.5% Ru/TiO$_2$ | ND | 35 | 40.1 | 18.2 |
| 31 | — | Reused above + 0.06 g CrCl$_3$.6H$_2$O | 2.7 | 55 | 34.6 | 17.9 |
| 32 | 3 | 0.5% Ru-0.06% Ni/TiO$_2$ | 3.6 | 35 | 39.5 | 19.9 |
| 33 | 3 | 0.5% Ru-0.06% Co/TiO$_2$ | 3.1 | 34 | 42.9 | 19.9 |
| 34 | 5 | 0.5% Ru-0.32% Co/TiO$_2$ | ND | 20 | 38.1 | 21.2 |
| 35 | 3 | 0.5% Ru-0.06% Mn/TiO$_2$ | 3.1 | 25 | 40.1 | 17.9 |
| 36 | 3 | 0.5% Ru-0.06% Fe/TiO$_2$ | 3.2 | 25 | 32.9 | 24.3 |
| 37 | 5 | 0.5% Ru/ZnAl$_2$O$_4$ | ND | 20 | 43.7 | 32.9 |
| 38 | — | Reused above aq.cat.slurry | ND | 20 | 51.2 | 26.5 |
| 39 | — | Reused above + 0.27 g CrCl$_3$.6H$_2$O | 3.4 | 20 | 42.1 | 26.3 |
| 40 | 2 | 0.5% Ru-0.06% Cr/ZnAl$_2$O$_4$ | 5.7 | 30 | 50.6 | 38.1 |
| 41 | 3 | 0.5% Ru-0.06% Co/ZnAl$_2$O$_4$ | 5.3 | 25 | 51.0 | 38.5 |
| 42 | 3 | 0.5% Ru-0.13% Co/ZnAl$_2$O$_4$ | ND | 30 | 58.7 | 35.4 |
| 43 | — | Reused above aq.cat.slurry | ND | 65 | 60.9 | 30.3 |
| 44 | — | Again reused above slurry | 5.5 | 72 | 56.2 | 28.6 |
| 45 | 3 | 0.5% Ru-0.2% Co/ZnAl$_2$O$_4$ | 6.1 | 40 | 53.0 | 39.0 |
| 46 | 2 | 0.5% Ru-0.06% Ni/ZnAl$_2$O$_3$ | 6.1 | 35 | 52.8 | 36.9 |
| 47 | 4 | 0.5% Ru-0.075% Fe/ZnAl$_2$O$_3$ | 5.6 | 20 | 43.6 | 36.7 |
| 48 | 2 | 0.5% Ru-0.06% Mn/ZnAl$_2$O$_4$ | 5.4 | 25 | 38.2 | 39.0 |

*No water added initially. Indicated amounts of water added in succeeding runs using same aqueous catalyst slurry.
*Filtrol 71 is a commercial, naturally derived silica-alumina, mainly a montmorillonite clay, having about 71% SiO$_2$.
*No support present, Ru and Ni salts merely charged to reactor in aqueous solutions.
*Only 210 g benzene. Catalyst size - 20 mesh.
*Zirconia-supported catalysts - 35 mesh.
*Run at 1500 psig - hydrogen pressure.

The data in Table II show that benzene was selectively hydrogenated to cyclohexene with relatively high conversion and short reaction times in a large number of invention runs at essentially neutral or low aqueous phase pH levels and with a number of catalyst variations. The catalyst variations included operable supports such as alumina, chromia, silica-alumina, clay, silica, zirconia, titania, and zinc aluminate. Zirconium silicate in run 18 was not found to be successful under the conditions tested. The supported ruthenium catalyst was successfully promoted by metals such as manganese, nickel, cobalt, chromium, and iron. Palladium was found to be a poor promoter in run 12 under the conditions tested. Run 17 showed that a ruthenium-free catalyst was poor despite the presence of nickel and tungsten promoters. Runs 8, 9, 10, and 11 demonstrated that the presence of sufficient water to form an aqueous phase is essential to the invention.

We claim:

1. A process for the conversion of aromatic hydrocarbons to the corresponding cyclic olefins which consists essentially in partially hydrogenating said aromatic hydrocarbons in an aqueous dispersion maintained at essentially neutral or acid pH conditions with hydrogen under hydrogenation conditions and with a catalyst composed of ruthenium plus a metal selected from the group consisting of manganese, cobalt, and nickel supported on alumina or zinc aluminate.

2. A process according to claim 1 for the selective partial hydrogenation of aromatic hydrocarbons selected from (a) mononuclear aromatic hydrocarbons and alkyl derivatives thereof, (b) condensed polyaromatic hydrocarbons and alkyl derivatives thereof, and (c) noncondensed polyaromatic hydrocarbons and alkyl derivatives thereof.

3. A process according to claim 1 wherein toluene is partially hydrogenated to methyl cyclohexene in water in the presence of a ruthenium-nickel-manganese-alumina catalyst.

4. A process according to claim 1 wherein benzene is partially hydrogenated to cyclohexene in water in the presence of a ruthenium-nickel-alumina catalyst.

5. A process according to claim 1 wherein naphthalene is partially hydrogenated to tetrahydronaphthalenes or tetrahydronaphthalene is partially hydrogenated to octahydronaphthalenes in water in the presence of a ruthenium-cobalt-zinc aluminate catalyst.

6. A process according to claim 1 wherein the hydrogenation is effected at temperatures in the range of 100°–400°F and the total amount of ruthenium present in said catalyst is in the range 0.01–2 weight percent of the total catalyst composition and the pH of the aqueous dispersion is less than 7.5.

7. A process according to claim 6 wherein toluene is partially hydrogenated to methyl cyclohexenes in water in the presence of a ruthenium-nickel-manganese-alumina catalyst.

8. A process according to claim 6 wherein naphthalene is partially hydrogenated to tetrahydronaphthalenes or tetrahydronaphthalene is partially hydrogenated to octahydronaphthalenes in water in the presence of a ruthenium-cobalt-zinc aluminate catalyst.

9. A process according to claim 6 wherein benzene is partially hydrogenated to cyclohexene in water in the presence of a ruthenium-nickel-alumina catalyst.

10. A process for the conversion of aromatic hydrocarbons to the corresponding cyclic olefins which comprises partially hydrogenating said aromatic hydrocarbons in an aqueous phase maintained at essentially neutral or acid pH conditions with hydrogen under hydrogenation conditions in the presence of a supported ruthenium catalyst promoted with at least one metal selected from the group consisting of chromium, molybdenum, tungsten, manganese, cobalt, nickel, and iron.

11. A process according to claim 10 wherein the amount of promoter metal present ranges from about 0.01 to about 2 moles per mole of ruthenium, and the amount of ruthenium present ranges from about 0.001 to about 25 weight percent, based on the support.

12. A process according to claim 10 for the selective partial hydrogenation of aromatic hydrocarbons selected from (a) mononuclear aromatic hydrocarbons and alkyl derivatives thereof, (b) condensed polyaromatic hydrocarbons and alkyl derivatives thereof, and (c) noncondensed polyaromatic hydrocarbons and alkyl derivatives thereof.

13. A process according to claim 10 wherein the hydrogenation is effected at temperatures in the range of 100–400°F and the total amount of ruthenium present in said catalyst is in the range 0.01–2 weight percent of the total catalyst composition and the pH of the aqueous dispersion is less than 7.5.

14. A process according to claim 10 wherein benzene is partially hydrogenated to cyclohexene in water in the presence of a supported ruthenium catalyst promoted with chromium, molybdenum, or tungsten.

15. A process according to claim 10 wherein benzene is partially hydrogenated to cyclohexene in water in the presence of a supported ruthenium catalyst promoted with manganese.

16. A process according to claim 10 wherein benzene is partially hydrogenated to cyclohexene in water in the presence of a supported ruthenium catalyst, promoted with cobalt, nickel, or iron.

17. A process according to claim 10 wherein benzene is partially hydrogenated to cyclohexene in water in the presence of a supported ruthenium catalyst promoted with at least two transition metals selected from the group consisting of chromium, molybdenum, tungsten, manganese, cobalt, nickel, and iron.

18. A process according to claim 10 wherein said promoted ruthenium catalyst is supported on a material selected from the group consisting of alumina, chromia, silica-alumina, clay, silica, zirconia, titania, and zinc aluminate.

* * * * *